Patented Nov. 15, 1938

2,136,998

UNITED STATES PATENT OFFICE 2,136,998

PROCESS FOR PREPARING 2-BZ-1'-DIBENZANTHRONYL

Clarence F. Belcher, South Milwaukee, Wis., assignor to E. I. du Pont de Nemours & Company, Wilmington, Del., a corporation of Delaware No Drawing. Application December 23, 1936, Serial No. 117,342

4 Claims. (Cl. 260—363)

This invention relates to a new and improved process for preparing 2-Bz-1'-dibenzanthronyl.

In copending application Serial No. 112,351, filed November 23, 1936, there has been disclosed a process for preparing 2-benzanthroneacrylic acid by reacting 2-benzanthronealdehyde with anhydrous sodium acetate or with malonic acid in pyridine, etc. I have found that this 2-benzanthroneacrylic acid can be condensed with methyleneanthrone to give 2-Bz-1'-dibenzanthronyl of high purity and in excellent yields. 2-Bz-1'-dibenzanthronyl is of special value in the preparation of isodibenzanthrone, and it has been found that the product obtainable by the process hereinafter described can be converted to isodibenzanthrone, on fusion with the alcoholic potash, in quantitative yields.

It is therefore an object of this invention to provide a new and improved process for preparing 2-Bz-1'-dibenzanthronyl of exceptionally high purity in excellent yields.

According to this invention, 2-benzanthroneacrylic acid is reacted with methyleneanthrone in an organic solvent and in the presence of a mild oxidizing agent (which may be the solvent itself), at elevated temperatures, as more fully described in the following examples in which the parts used are by weight.

Example 1

20 parts of 2-benzanthroneacrylic acid (M. P. 283–285° C.), 20 parts of methyleneanthrone (prepared according to the method of Barnett, Berichte 59; 767) and 160 parts of nitrobenzene are heated under agitation at 180–200° C. for one hour. The reaction mass is then stirred until cool. The 2-Bz-1'-dibenzanthronyl separates as yellow crystals. The crude product melts at 317–319° C. and after one recrystallization from nitrobenzene or pyridine melts at 338–339° C. It is insoluble in dilute alkali, but dissolves in concentrated sulfuric acid to a red-orange solution with yellowish red fluorescence.

Example 2

5 parts of 2-benzanthroneacrylic acid, 5 parts of methyleneanthrone and 60 parts of o-nitrotoluene are heated under agitation for one hour at 190–210° C. When the reaction mass has cooled to 120–130° C. it is diluted with an equal volume of glacial acetic acid and stirred until cool. The product which separates as yellow crystals is collected by filtration and is identical with that obtained in Example 1.

Example 3

4.5 parts of benzanthrone-2-acrylic acid, 4.5 parts of methyleneanthrone and 70 parts of trichlorobenzene are heated under agitation for ½ hour at 180–200° C.; then while maintaining that temperature a current of air is passed under the surface of the reaction mixture for one hour. The charge is cooled to room temperature, diluted with alcohol, filtered, and the yellow crystalline residue washed with alcohol. The product is identical with that obtained in the preceding examples.

The 2-Bz-1'dibenzanthronyl obtainable by the process above described can be converted substantially quantitatively to isodibenzanthrone by the known procedure.

As illustrated in the examples, nitrobenzene, nitrotoluene, or a similar solvent which is itself a mild oxidizing agent may be employed, or an inert solvent may be used with the addition of a mild oxidizing agent such as air or oxygen.

The reaction may be carried out satisfactorily at temperatures above 170° C. At lower temperatures the time required to complete the reaction is unnecessarily prolonged. Temperatures above 210° C. are not required.

The 2-benzanthroneacrylic acid employed as the starting material for the process above described may be prepared as follows:

50 parts of benzanthrone-2-aldehyde obtained according to the method of U. S. Patent 1,935,949, and 25 parts of anhydrous sodium acetate are stirred into 300 parts of acetic anhydride. The whole is stirred and heated at the reflux temperature for one and one-half hours. The partially cooled reaction mixture is poured into about 2000 parts of water made slightly acid with hydrochloric acid and the whole is stirred and heated until the crude benzanthrone-2-acrylic acid is well dispersed. The product is collected by filtration and washed free from acid. It is slurried in warm water and the benzanthrone-2-acrylic acid extracted with dilute ammonia. The ammoniacal solution is acidified and the benzanthrone-2-acrylic acid obtained as a yellow precipitate. It dissolves in concentrated sulfuric acid to a red solution without fluorescence.

I claim:

1. The process for the preparation of 2-Bz-1'-dibenzanthronyl which comprises heating 2-benzanthroneacrylic acid with methyleneanthrone in an organic solvent at reaction temperatures and in the presence of a mild oxidizing agent.

2. The process for the preparation of 2-Bz-1'- dibenzanthronyl which comprises heating 2-benzanthroneacrylic acid with methyleneanthrone in an organic solvent having a mild oxidizing action at reaction temperatures.

3. The process which comprises heating 2-benzanthroneacrylic acid with methyleneanthrone in nitrobenzene at temperatures of from 170° C. to the boiling point of the mass until the reaction is completed, and separating out the 2-Bz-1'-dibenzanthronyl so formed.

4. The process for preparing 2-Bz-1'-dibenzanthronyl which comprises reacting 20 parts of 2-benzanthroneacrylic acid with 20 parts of methyleneanthrone in nitrobenzene at temperatures of from 180 to 210° C., for approximately one hour, and separating out the precipitate which results on cooling.

CLARENCE F. BELCHER.